Patented Dec. 8, 1942

2,304,537

UNITED STATES PATENT OFFICE 2,304,537

PREPARATION OF α-CHLORMETHYL NAPHTHALENE

Adrien Cambron, Ottawa, Ontario, Canada, assignor to The Honorary Advisory Council for Scientific and Industrial Research, Ottawa, Ontario, Canada, a corporation of Canada No Drawing. Application September 29, 1938, Serial No. 232,289

3 Claims. (Cl. 260—649)

This invention relates to naphthyl acetic acid, its esters and salts and more particularly to an improved method of producing α-naphthyl acetic acid, its esters and salts.

The object of the invention is to provide a method whereby these compounds may be produced at much reduced cost in order that they may be made widely available for uses for which they are well adapted, as for example in the stimulation of germination and growth in seeds, plants and the like.

In accordance with the invention dichlormethyl ether is caused to react with naphthalene in the presence of an acid condensing agent, such as phosphoric or sulphuric acid and water, to yield α-chlormethyl naphthalene. This reaction proceeds best at a temperature of about 100° C. at ordinary pressures and when the mixture is kept well stirred in the reacting vessel. The corresponding acetonitrile is formed by known methods and the acetonitrile is heated with acetic acid in the presence of water and an acid hydrolyzing agent, such as sulphuric or phosphoric acid, to form the α-naphthyl acetic acid.

As illustrative of the detailed procedure found to give best results the following description is given. While one may begin with dichlormethyl ether the following illustrates the preferred procedure.

A mixture of 180 grams paraform, 750 cubic centimetres of glacial acetic acid and 576 grams naphthalene is heated, with stirring, to 98 to 100° C. and a mixture of 562.5 grams concentrated hydrochloric acid (37%) and 135 cubic centimetres syrupy phosphoric acid is added during a period of ten to fifteen minutes while heating at 100° C. is continued for a period of 3 hours with efficient stirring. The reaction mixture is poured into 3 litres of cold water and the water is decanted leaving the oily product which constitutes the lower layer. It is then washed by stirring two or three times with three litres of cold water, filtered from a small amount of solid insoluble product, and distilled in vacuum giving 400 grams or a 60% yield of α-chlormethyl naphthalene based on the naphthalene consumed.

The α-chlormethyl naphthalene is converted to the corresponding acetonitrile by known methods, as by refluxing for an hour with a solution of 225 grams of potassium cyanide in 1250 cubic centimetres of ethyl alcohol and 400 cubic centimetres of water. The alcohol is distilled off and the liquid product is washed with water, and is then extracted with ether. The extract is dried and filtered and the ether is distilled off, yielding crude α-naphthyl acetonitrile. By vacuum distillation, the pure nitrile may be obtained and purification of the nitrile at this stage renders the purification of the final product easier.

There is then added to the crude or the purified nitrile a solution of 750 grams of concentrated sulphuric acid, 750 cubic centimetres of water and 750 cubic centimetres of glacial acetic acid and while being stirred the mixture is heated at 120 to 125° C. for forty-five minutes. The α-naphthyl acetic acid formed is precipitated by the addition of five litres of cold water. The esters may be formed by replacing the acetic acid with an alcohol. That is, the acid hydrolysis of the nitrile is effected in the presence of an alcohol.

The α-naphthyl acetic acid may be purified by dissolving in 50% alcohol solution and treating the solution, while boiling, with charcoal. It may be again precipitated with cold water, filtered and dried. A yield of 263 grams of pure naphthyl acetic acid having a melting point of 131° C. is thus obtained from 400 grams of α-chlormethyl naphthalene.

Alternatively the acid may be purified by dissolving in moderately concentrated caustic alkali solution, filtered from insoluble products, and the pure α-naphthyl acetic acid may then be precipitated by the addition of excess mineral acid, or the alkali salt may be obtained by evaporation.

It should be stated that highest yields have been obtained when phosphoric acid is used in forming the chlormethyl naphthalene but other condensing agents may be used as previously indicated.

This application is a continuation in part of application Serial No. 182,000, filed December 27, 1937.

I claim:

1. In the production of alpha-naphthyl acetic acid its esters and salts the method which comprises adding syrupy phosphoric acid, as a condensing agent and concentrated hydrochloric acid to a mixture of paraform, acetic acid and naphthalene while stirring the mixture at a temperature of about 100° C. to cause the formation of alpha-chlormethyl naphthalene by reaction with dichlormethyl ether formed in situ in the presence of said condensing agent.

2. A method as described in claim 1 wherein a mixture of 562.5 grams of concentrated hydrochloric acid and 135 c. c. of syrupy phosphoric acid is gradually added to a heated mixture of 180 grams paraform, 750 c. c. of acetic acid and 576 grams of naphthalene and while stirring the mixture maintaining the temperature at about 100° C. for a period of substantially three hours to form alpha-chlormethyl naphthalene.

3. In the production of alpha-naphthyl acetic acid, its esters and salts, the method which comprises heating at substantially 100° C. for a period of about three hours paraform, naphthalene and concentrated hydrochloric acid in the presence of acetic acid and as a condensing agent one of the group consisting of sulphuric and phosphoric acids to form alpha-chlormethyl naphthalene.

ADRIEN CAMBRON.